W. J. CHAPMAN & W. ROBERTSON.
MARKET QUOTATION INDICATOR.
APPLICATION FILED JULY 1, 1908.
986,045.
Patented Mar. 7, 1911.
3 SHEETS—SHEET 1.
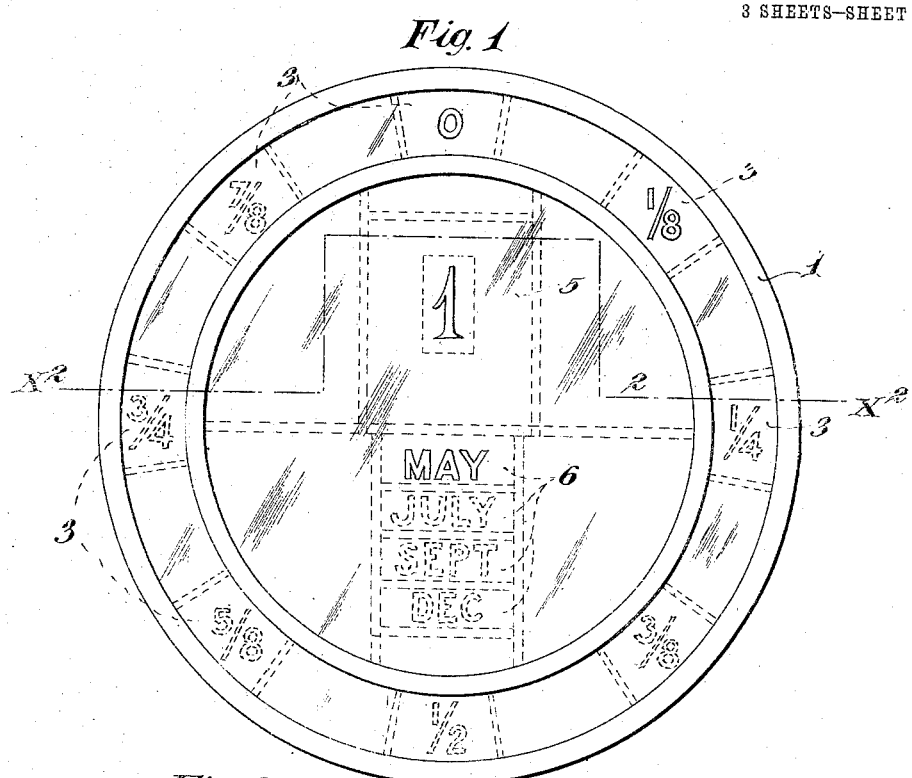
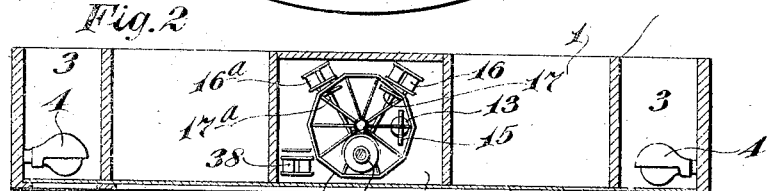
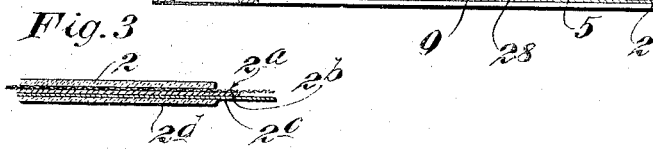
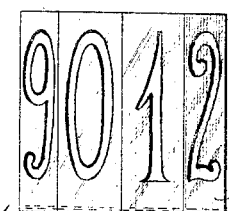
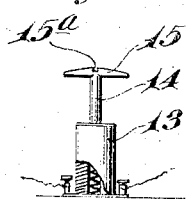
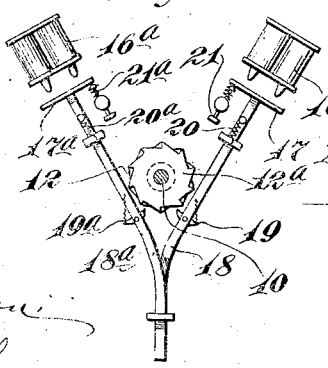
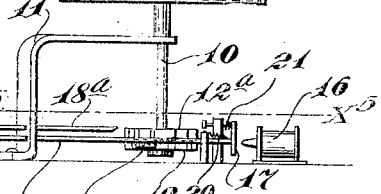
Witnesses:
L. L. Simpson
A. H. Opsahl
Inventors:
Wm. J. Chapman
Wm. Robertson
By their Attorneys:
Williamson & Merchant W. J. CHAPMAN & W. ROBERTSON.
MARKET QUOTATION INDICATOR.
APPLICATION FILED JULY 1, 1908.

986,045.

Patented Mar. 7, 1911.

3 SHEETS—SHEET 2.

Witnesses:
L. L. Simpson
A. H. Opsahl

Inventors:
Wm. J. Chapman,
Wm. Robertson,
By their Attorneys:
Williamson & Merchant

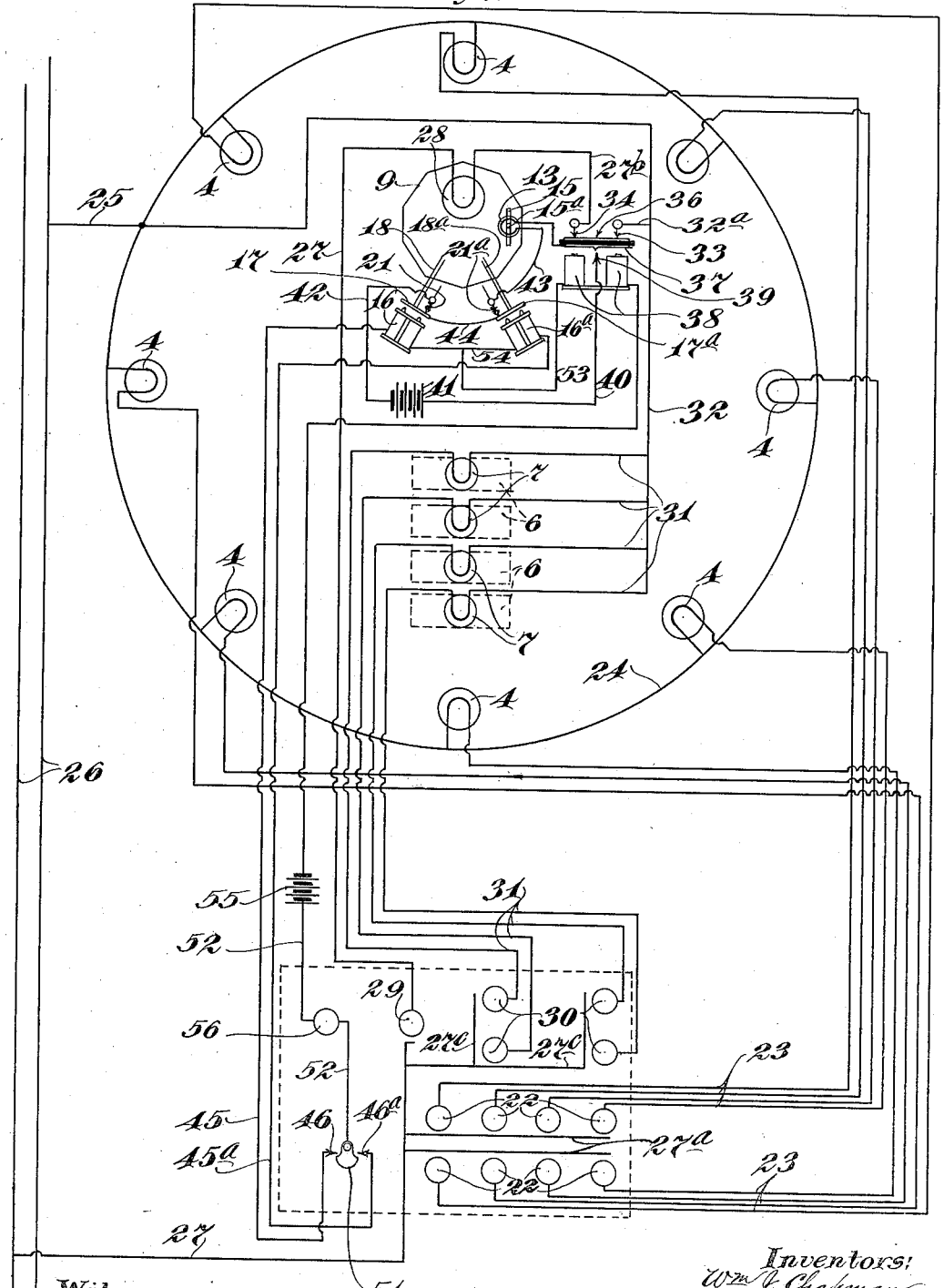

UNITED STATES PATENT OFFICE.

WILLIAM J. CHAPMAN AND WILLIAM ROBERTSON, OF MINNEAPOLIS, MINNESOTA.

MARKET-QUOTATION INDICATOR.

986,045.

Specification of Letters Patent. Patented Mar. 7, 1911.

Application filed July 1, 1908. Serial No. 441,312.

*To all whom it may concern:*

Be it known that we, WILLIAM J. CHAPMAN and WILLIAM ROBERTSON, citizens of the United States, residing at Minneapolis, in the county of Hennepin and State of Minnesota, have invented certain new and useful Improvements in Market-Quotation Indicators; and we do hereby declare the following to be a full, clear, and exact description of the invention, such as will enable others skilled in the art to which it appertains to make and use the same.

Our invention has for its object to provide an improved apparatus for indicating changes in market prices, quotation scores, combinations of figures, etc., and the particular object had in view is the provision of a highly efficient electrically controlled quotation indicator for use in grain and stock exchanges.

To the above ends the invention consists of the novel devices and combinations of devices hereinafter described and defined in the claims.

In the accompanying drawings, wherein like characters indicate like parts throughout the several views, we have illustrated a form of the improved indicator which has been put into actual use and found efficient for the purposes had in view.

Figure 7:
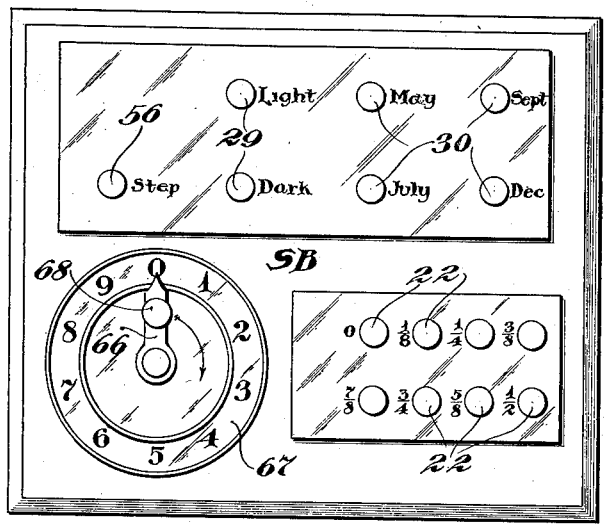
Figure 8:
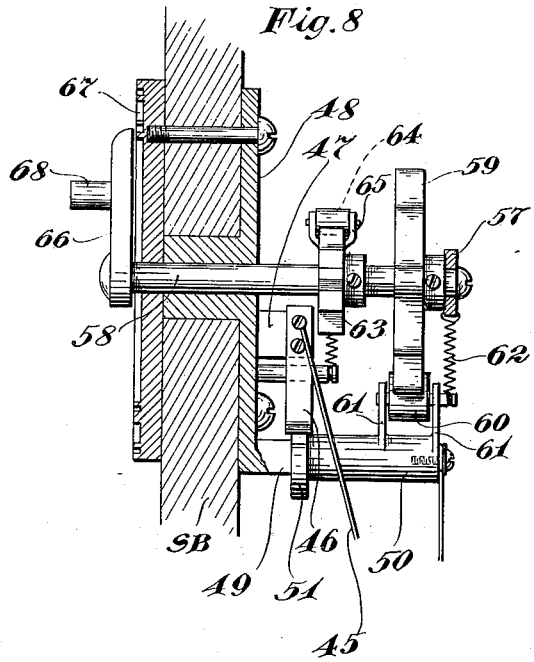
Figure 9:
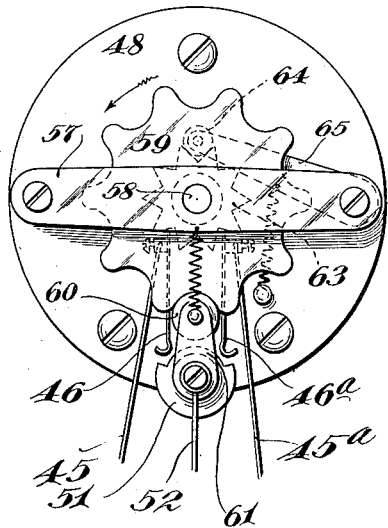

Referring to these drawings, Figure 1 is a view in elevation, looking at the face of the indicator proper. Fig. 2 is a horizontal section taken on the irregular line $x^2$ $x^2$ of Fig. 1. Fig. 3 is a detail in section showing, on an exaggerated scale, the component parts of the dial of the indicator. Fig. 4 is a detail view in elevation, showing the numeral wheel of the indicator and certain coöperating actuating means. Fig. 5 is a horizontal section, taken on the line $x^5$ $x^5$ of Fig. 4. Fig. 6 is a detail in elevation, showing the solenoid and lock plunger for locking and releasing the numeral wheel of the indicator. Fig. 7 is a view in elevation showing the controller or switch board of the indicator. Figs. 8 and 9 are views, respectively, in vertical section and rear elevation, showing a so-called current pulsating device; and Fig. 10 is a diagrammatic view, showing the electrical connections of the entire apparatus.

In the present illustration, the indicator is made to show grain quotations in digits and fractions, and also the four grain delivery months. The figures and letters, shown by solid lines in Fig. 1, are indications, while those indicated by dotted lines are possible indications.

The case or framework 1 of the indicator proper may be made of wood or any other suitable material arranged with suitable light-proof compartments. The dial or face plate of the casing 1 may be constructed in different ways, but should have transparent or translucent characters over the several light compartments. Preferably, however, the said face is built up as follows: First, a sheet of clear glass 2, then a color screen $2^a$, preferably celluloid; then a sheet of metal or other opaque material $2^b$ from which is cut the stencil of the desired indication, then a sheet of tracing cloth or vellum $2^c$, and finally, a plate of ground glass $2^d$, all of which parts are firmly pressed together and are thoroughly stopped at their edges to prevent light rays from showing anywhere but through the stencil.

The glass on each side of the stencil is for the purpose of holding the stencil firmly in line and producing a clear, sharp cut indication. The tracing cloth and ground glass make an evenly illuminated indication, regardless of the position of the lamp; and, furthermore, screens the stencil from view when not illuminated. The color screen is used for the purpose of projecting the indication in some color, such as red or green, contrasting with the ground glass front and producing an indication which can be easily read in a well lighted room. In Fig. 3, which shows the arrangement of the component parts of the face plate, the plate 2 is at the inner side, and the plate $2^d$ at the outer side of the indicator frame or box to which the said composite face is suitably secured at its margin.

The case 1 of the indicator is formed with a circumferentially spaced series of light compartments 3, in which are contained electric lamps 4. The stencil in the dial is formed with fraction indications that cover the light compartments 3, as shown in Fig. 1. Within the circular zone which includes the fractional light compartments 3, the case 1 is formed with a wheel compartment 5 and four light compartments 6, in each of which latter is a small electric lamp 7. The stencil of the dial, immediately over the compartment 5, is cut away, and over the compartment 6 is cut away to indicate the four grain delivery months, i. e., May, July, Sept. and Dec.

The numeral wheel 9, shown in detail in Fig. 4, carries ten numeral stencils, each indicating one of the digits 0 to 9 inclusive, any one of which figures are adapted to be turned directly in front of the opening cut in the stencil of the dial. This numeral wheel is carried by a shaft 10 mounted in a bracket 11 and other suitable bearings (not shown) on the case 1, and provided with two ratchet wheels 12, and 12$^a$ arranged to drive the wheel in opposite directions. To correspond to the numeral wheel carrying the ten digit indicating stencils, the ratchet wheels 12 and 12$^a$ are each provided with ten teeth. Also as preferably constructed, the wheel 9 is provided with ten spokes, and to lock this wheel in proper position so as to have one or the other of the digits of the stencil register with the opening in the dial, a solenoid 13 and a movable spring-pressed core 14, the latter having a bevel head 15 with lock notch 15$^a$, is provided. Normally, one of the spokes of the numeral wheel is engaged in the notch 15$^a$ of the head 15, the solenoid 13 being normally deënergized. The lock made up of the head 15 is released from the spoke when the solenoid 13 is energized through connections presently to be described.

For indirectly imparting motion to the ratchet wheels 12 and 12$^a$, respectively, are magnets 16 and 16$^a$. Armatures 17 and 17$^a$, respectively, coöperate with the magnets 16 and 16$^a$, and these armatures are secured, respectively, to the ends of sliding bars 18 and 18$^a$, which in turn are provided, respectively, with spring-pressed driving dogs 19 and 19$^a$ that engage the respective ratchet wheels 12 and 12$^a$. Normally, or when the magnets 16 and 16$^a$ are deënergized, the armatures 17 and 17$^a$ are retracted by coiled springs 20 and 20$^a$; at this time both of the dogs 19 and 19$^a$ stand out of engagement with the ratchet wheels 12 and 12$^a$. Spring-pressed contacts 21 and 21$^a$ normally engage the armatures 17 and 17$^a$, respectively, all as best shown in Figs. 4 and 5.

Fig. 7 shows in detail a switch board SB for controlling the indicator proper above described, and this switch board is also diagrammatically illustrated in Fig. 10. The eight switches 22 may be of any suitable type, but for the purposes of illustration we shall assume that they are normally open. These switches 22 are connected on one side by wires 23 to lamps 4 of the so-called fractional light compartments, in front of which the stencil of the indicator dial is provided with corresponding fractional indications. All of the lamps 4 are connected on one side to a wire 24 shown in the form of a circle in the diagram view Fig. 10, and this wire 24, as shown in said diagram view, is connected by wire 25 to one of a pair of lighting mains 26. The other lighting main 26 is shown as connected, by wire 27, to a lamp 28 that is located and is suitably supported inside of the rotary numeral wheel 9 (see Figs. 2 and 10). The wire 27 is shown as provided with branches 27$^a$ with which any one of the eight wires 23 may be connected by closing of one or the other of the switches 22. A normally closed switch 29 which, as shown, is located at the switch board SB, is interposed in the wire 27. Also on the switch board is another group of four normally open switches 30 that are connected on one side, by wires 31, one to each of the lamps 7 that are located within the light compartments 6. The four wires 31 are connected, by a wire 32, to one of the lighting mains 26, this connection, as shown, being made through the wire 25. The wire 32 is connected, by a wire 32$^a$, to a fixed contact 33, and the wire 27 is extended at 27$^b$ and is connected to a fixed contact 34 (see Fig. 10), which two contacts 33 and 34 are spaced apart but in close proximity and are normally engaged by a metal bridge bar 36 of a movable armature made up of the said bar 36 and of another bar 37, which two bars are insulated from each other. The armature 36—37 is adapted to be moved by relay magnets 38, and when moved, its bar 37 is adapted to be engaged with a fixed contact 39, while the bar 36 will be disengaged from the contacts 33 and 34. The contact 39 is connected, by a wire 40, to one terminal of a battery 41, the other terminal of which battery is connected by a wire 42 to the yielding contact 21. The other yielding contact 21$^a$ is connected, by a wire 43, to the armature bar 37, and the solenoid 13 already described is interposed in this wire 43. A wire 44 connects the two armatures 17 and 17$^a$, all as best shown in Fig. 10. The wire 27 at the switch board SB is provided with branches 27$^c$ through which the circuit, including the wire 27, may be closed by movement of one of the four switches 30. The eight switches 22 constitute one group, and the four switches 30 constitute another group of switches; and these groups are preferably arranged in interlocking sets of standard or any other arrangement wherein the closing of any one of the switches of a group opens or insures opening of all of the other switches of that group.

For controlling the position of the numeral wheel 9 from a distant point, to-wit, from the switch board which is located at a point more or less remote from the indicator, we provide an electrical controller, which includes a pulsator or means for sending electrical impulses over the controlling line, so as to thereby intermittently energize the magnets 16 and 16ª, which magnets, as well as the coöperating ratchet devices, constitute part of this controller and, as already described, are located at the indicator proper. The said magnets 16 and 16ª are connected, respectively, by wires 45 and 45ª to fixed contacts 46 and 46ª located on the switch board and, as shown, being in the form of spring blades secured to but insulated from a lug 47 of a bearing plate 48, which latter is rigidly secured to the bottom of the said switch board, as best shown in Figs. 8 and 9.

Describing now the parts that make up what may be designated as a pulsator, the numeral 49 indicates a stud that projects from the bearing plate 48 just below the contacts 46 and on which is mounted an oscillatory sleeve 50. This sleeve 50 has a segmental contact flange 51, which, in its normal position shown in Fig. 9, engages with neither of the contacts 46—46ª, but which, by slight oscillation of said sleeve, may be engaged with either thereof, according to the direction of oscillation. This sleeve 50, and hence, the segmental contact 51, is connected by a wire 52 to the relay magnets 38 and thence, as shown, by wires 53—54 to the two escapement magnets 16—16ª of the electrical controller. In the arrangement described, the wire 52 constitutes a common return from the magnets 16—16ª and 38, and interposed therein is a battery or other source of electrical energy 55. Also as shown, a normally closed switch 56 is interposed in the return wire 52.

Journaled in the hub of the bearing plate 48 and in a bar 57 secured thereto, is a controller shaft 58 which, at one end, is provided with a star wheel or notched disk 59 having ten notches, preferably of approximately semi-circular form. The notch of this disk, which is at the bottom thereof, engages a small wheel 60 shown as journaled to the ends of a pair of arms 61 carried by the sleeve 50 of the segmental contact 51. A coiled tension spring 62, connected to one of the arms 61 and to the bar 57 normally holds the parts 61, 50 and 51 in their intermediate positions shown in Figs. 8 and 9. The shaft 58 also carries a second star wheel 63 that is engaged by a roller or wheel 64 carried at the free end of a downwardly spring-pressed retaining pawl 65, which latter is pivoted to a suitable support on the bearing plate 48 and serves to yieldingly hold the shaft 58 and main star wheel 59 in any one of the ten positions in which it may be set. At its other end, to-wit, its left hand end as shown in Fig. 8, the shaft 58 is provided with an operating arm 66 that is preferably pointed and coöperates with an annular scale or indicator ring 67 secured to the adjacent face of the switch board SB, as best shown in Figs. 7 and 8. This operating arm 66 is shown as provided with a finger-piece 68 by means of which the said armature 66 and hence the shaft 58 and parts carried thereby may be rotated or given a rotary step by step movement.

By means of the electrical controller above described, the numeral wheel 9 may be given any desired number of steps of movement in either direction, and hence may be set with any one of its digits exposed at the dial. If, for instance, it is desired to move the numeral wheel so that its digit 2 will be exposed at the dial, the operating lever 66 is moved in the direction of the arrow marked on Fig. 7 until its pointer registers with the numeral 2 on the ring 67. This movement of the arm 66 will, of course, impart corresponding movement to the shaft 58 and to the star wheel 59, thus imparting two steps or notches of movement to the latter in the direction of the arrow marked on Fig. 9. Each notch or step of movement imparted to the star wheel 59 will, acting on the wheel 60, cause the sleeve 50 and segmental contact 51 to make two oscillations, and each such oscillation will engage the said segmental contact 51 with the spring contact 46 and again separate the same. Thus it will be seen that for each notch or step of movement imparted to the star wheel 59, an electrical impulse will be sent over one side or the other of the controller circuit. For instance, in the illustration just above given two electrical impulses will be sent over the circuit including wire 45, magnet 16, wires 54—53, relay magnets 38 and return wire 52. This causes magnet 16 to twice reciprocate bar 18, thereby causing the pawl 19 of the latter operating twice on the ratchet wheel 12 to impart two steps of movement to the numeral wheel 9, as already stated. The numeral wheel may be returned to normal or zero position by continuing the movement of the arm 66 and cam or star wheel 59 in the same direction noted, to-wit, in the direction of the arrow marked on Fig. 7, while it may be restored to normal position by a backward movement of the said arm 66 and cam wheel 59 When the said cam wheel 59 is turned backward, the segmental contact 51 will be intermittently engaged with the spring contact 46ª, and the circuit which is then intermittently closed will be through wire 45ª, magnet 16ª, wires 54—53, relay magnets 38 and return wire 52. This intermittently energizes the said magnets 16ª with the result that the bar 18ª will be oscillated and its pawl 19ª, operating on the ratchet wheel 12ª, will impart the required backward movement to the said numeral wheel. It is thus evident that the numeral wheel will follow movements of the controlling arm 66 in either direction.

Whenever the controlling circuit above described is closed either through the magnet 16 or through the magnet 16ª, it has been noted, the relay magnets 38 are energized. The first effect of this is to move the relay armature so as to remove the armature bar 36 from the contacts 33—34, thereby breaking the circuit through the lamp 28 which is within the numeral wheel. This puts out the light in the numeral wheel so that subsequent movement of the said wheel is not made visible on the dial. This same movement of the armature causes the bar 37 to engage fixed contact 39 and thereby close the local circuit through wire 40, battery 41, contact 21, wire 44, contact 21ª, wire 43 and solenoid 13, thereby energizing the solenoid and causing the latter to draw downward the lock 15 and thereby release the numeral wheel so that it will be free for movement under the action of whichever of the two magnets 16—16ª is energized. The yielding or follow-up contacts 21 and 21ª will maintain engagement with the coöperating armature 17 and 17ª long enough to permit initial movement of the numeral wheel, but will break the circuit through the solenoid 13 and thereby release the lock 15 at a time early enough to permit the said lock to be again ready to lock the wheel when it has completed its step of movement. As is evident, whenever the cam wheel 59 completes its step of movement, the spring 62 (see Figs. 8 and 9) will throw the segmental contact 51 back to normal position, thereby breaking the circuit through whichever of the magnets 16—16ª happens to have been energized, and also breaking the circuit through the relay magnets 38. This, of course, permits the armature 36 to be restored to its normal position, shown in Fig. 10, under the action of a suitable spring (not shown), thereby again closing the circuit through the lamp 28 which is within the numeral wheel, and causing the illumination of the digit of the wheel located in front of the dial. Also when the magnet 16—16ª are deënergized, the coöperating bar 18 or 18ª will be restored to normal position by its spring 20 or 20ª as the case may be.

By closing the proper switch 22 the circuit may be closed through the lamp 4, which will cause the proper fractional indication on the dial of the indicator; and by closing the proper switch 30, the circuit may be closed through the lamp 7, which will give the proper delivery month indication on the dial of the said indicator.

What we claim is:

1. In an indicating apparatus, the combination with a rotary indicating wheel having characters, a lock normally holding said wheel against rotation, a lock releasing solenoid, a pawl and ratchet device for imparting step by step rotary movement to said indicator wheel, a controlling circuit including a magnet for actuating said pawl and ratchet device, a local circuit including said lock releasing solenoid, means for intermittently closing the controlling circuit, and means whereby when said controlling circuit is closed said local circuit will be closed and said solenoid energized long enough to effect the release of said wheel lock.

2. In an indicating apparatus, the combination with a rotary wheel having characters, of an electric lamp for illuminating said wheel, a controlling circuit including a magnet, means subject to said magnet for imparting step by step rotary movement to said wheel, means for intermittently opening and closing said controlling circuit, a lamp circuit, and automatic circuit controlling means for opening said lamp circuit when said controlling circuit is closed, whereby the characters on said wheel will be rendered invisible while said wheel is being rotated.

3. In an indicating apparatus, the combination with an indicator proper having a dial provided with light compartments, and with lamps in said light compartments, certain of said light compartments having transparent characters, of an illuminated indicator wheel rotatively mounted in one of said light compartments, a divided controlling circuit including in each side a magnet in the vicinity of said wheel, and including also a common reversing switch and means for sending electrical impulses to one or the other of said magnets according to the position of said reversing switch, a pair of reversely acting ratchet wheels connected for rotation with said wheel, and a pair of reversely acting ratchet driving members having armatures subject one to each of said magnets and provided with driving pawls coöperating with respective ratchet wheels, substantially as described.

4. In an indicating apparatus, the combination with an indicator proper having a dial provided with light compartments and with lamps in said light compartments, certain of said light compartments having transparent characters, of an illuminated indicator wheel rotatively mounted in one of the said light compartments, an electrical controller for imparting step by step movement to said indicator wheel, and lamp circuits having switches located at points remote from said dial, substantially as described.

In testimony whereof we affix our signatures in presence of two witnesses.

WILLIAM J. CHAPMAN.
WILLIAM ROBERTSON.

Witnesses:
HARRY D. KILGORE,
MALIE HOEL.